United States Patent [19]
Bonomi et al.

[11] Patent Number: 5,831,971
[45] Date of Patent: Nov. 3, 1998

[54] METHOD FOR LEAKY BUCKET TRAFFIC SHAPING USING FAIR QUEUEING COLLISION ARBITRATION

[75] Inventors: Flavio Giovanni Bonomi, Rumson; Albert Gordon Greenberg, Millburn; Jennifer Lynn Rexford, Summit, all of N.J.

[73] Assignee: Lucent Technologies, Inc., Murray Hill, N.J.

[21] Appl. No.: 701,341

[22] Filed: Aug. 22, 1996

[51] Int. Cl.⁶ .................................. H04J 1/16; H04J 3/14
[52] U.S. Cl. ............................................................. 370/230
[58] Field of Search ..................................... 370/229, 230, 370/232, 235, 412, 418, 395, 231, 413, 415, 428, 429

[56] References Cited

U.S. PATENT DOCUMENTS

| 5,381,407 | 1/1995 | Chao ........................................ 370/233 |
| 5,533,020 | 7/1996 | Byrn et al. .............................. 370/395 |
| 5,566,163 | 10/1996 | Petit ........................................ 370/395 |
| 5,570,360 | 10/1996 | Klausmeier et al. ................... 370/412 |

OTHER PUBLICATIONS

K. van der Wal et al., "Implementation of a Police Criterion Calculator based on the Leaky Bucket Algorithm," *IEEE Houston GLOBECOM '93*, vol. 2, Nov./Dec. 1993, pp. 713–718.

A. K. Parekh et al., "A Generalized Processor Sharing Approach To Flow Control In Integrated Services Networks—The Multiple Node Case," *IEEE INFOCOM '93*, vol. 2, Mar. 1993, pp. 521–530.

H. Zhang et al., "Rate–Controlled Static–Priority Queueing," *IEEE INFOCOM '93*, vol. 1, Mar. 1993, pp. 227–236.

C. R. Kalmanek et al., "Rate Controlled Servers For Very High–Speed Networks," *IEEE GLOBECOM '90*, vol. 1, Dec. 1990, pp. 12–20.

H. Jonathan Chao, "Design Of Leaky Bucket Access Control Schemes In ATM Networks," *International Conference On Communications '91*, vol. 1, Jun. 1991, pp. 180–187.

A. G. Greenberg, "How Fair Is Fair Queuing:", *Journal of the Association for Computing Machinery*, vol. 39, No. 3, Jul. 1992, pp. 568–598.

A. K. Parekh et al., "A Generalized Processor Sharing Approach To Flow Control In Integrated Services Networks—The Single Node Case," *IEEE INFOCOM '92*, vol. 2, Jun. 1992, pp. 915–924.

S. Jamaloddin Golestani, "A Self–Clocked Fair Queueing Scheme For Broadband Applications," *IEEE INFOCOM '94*, vol. 2, Jun. 1994, pp. 636–646.

J. L. Rexford et al., "Hardware–Efficient Fair Queueing Architectures for High–Speed Networks," *SIGCOMM*, Aug. 1995.

*Primary Examiner*—Ajit Patel

[57] ABSTRACT

A method shapes traffic using leaky bucket shaping and fair queueing techniques to shape conforming and nonconforming incoming traffic into a compliant output stream on an outgoing link connected to a node. An admitted or arriving cell is assigned to one queue in a set of queues. When a cell reaches the head of its assigned queue, a virtual finishing time is assigned to the cell, even if the cell has not reached its conformance time. A server then selects for transmission on the outgoing link, the head-of-line cell form among the queues with the smallest virtual finishing time. If the server selects a nonconforming cell for transmission, the selected nonconforming cell is rescheduled for transmission. If the selected cell is conforming, it is transmitted on the outgoing link.

19 Claims, 3 Drawing Sheets

METHOD FOR LEAKY BUCKET TRAFFIC SHAPING USING FAIR QUEUEING COLLISION ARBITRATION

TECHNICAL FIELD

The invention relates to the field of methods for regulating traffic in a communications network.

BACKGROUND

A communications network is one means for transmitting or carrying traffic (e.g., signals representing information such as data, voice, text, and/or video) between endpoints (e.g., host machines, fax machines, or terminals) connected to the network. The network comprises nodes connected, to each other and to the endpoints, by links. Typically, each link is bi-directional (i.e., traffic may be conveyed or transmitted in the forward and reverse directions), and each link is characterized by parameters, such as bandwidth or capacity in each direction. The nodes advantageously include buffers. If a link does not have sufficient available bandwidth to carry traffic received at a node, a buffer in the node may be used to store the received traffic until such time as the link has sufficient available bandwidth.

Networks are increasingly being used for the reliable, high-speed transmission of traffic between endpoints over wide areas. This increased use is bringing major changes to network services and architecture/infrastructure design. In particular, a wide spectrum of new consumer and business services, such as video-on-demand and video teleconferencing, are expected to offered on Broadband Integrated Services Digital Networks (BISDN). These new services will be characterized by a wide range of traffic characteristics (e.g., bandwidth) and with different quality-of-service requirements (e.g., maximum delay through the network and maximum information loss rate). The principal technique for transmission in BISDN is Asynchronous Transfer Mode (ATM). See e.g., S. E. Minzer, "Broadband ISDN and Asynchronous Transfer Mode," *IEEE Comm. Mag.,* pp. 17–24. September 1989.

When traffic is to be carried in an ATM network, an initiating endpoint requests that a bi-directional path (i.e., a connection comprising nodes and links) be established in the network between the initiating endpoint and a specified destination endpoint. In an ATM network, the path that is established is a so-call "virtual circuit" (VC) by which it is meant that the initiating endpoint simply specifies the destination endpoint, and the network carries the traffic from the initiating endpoint to the destination endpoint as though they are connected by a direct circuit. A VC is also referred to herein as a connection. Traffic in an ATM network is formatted into cells or packets.

Admission control policies govern whether the network can accommodate a request to establish a new VC. The admission decision is typically based on: 1) traffic descriptors (e.g., average bandwidth and burstiness) characterizing the traffic to be carried on the VC once it is established, and 2) any quality-of-service requirements for the traffic. The admission decision will also be based on what resources are available in the network (e.g., the amount of unused bandwidth in links and unused buffer space in nodes) to accommodate the request. A request for a VC typically will specify or provide the traffic descriptors.

The network will, in turn (based on the specified traffic descriptors), determine the amount of network resources that will need to be assigned to the request. Based on the determination, the network will decide whether to admit the request. If the request is admitted, a "contract" is made by which the network agrees to carry the traffic and to meet any quality-of-service guarantees so long as the traffic stays within the specified traffic descriptors.

The performance of ATM networks depends on admitted connections complying with their contracts. For example, congestion may be caused by an endpoint supplying information to the network so as to exceed contract specifications thereby causing statistical fluctuations in the traffic flow through the network. Such fluctuations can degrade network performance and affect quality-of-service levels for other connections in the network. Accordingly, a network typically monitors, or controls traffic on, connections to ensure that the connections comply with their contracts.

Various techniques have been proposed to monitor and control traffic on networks. Such techniques may be implemented at the network ingress or egress (where compliance with traffic contracts is necessary when cells cross the boundary of network and enter a different network potentially operated by a different service provider). Implementation typically requires that a small portion of the traffic be devoted to traffic control, i.e., each technique requires a small amount of overhead. Three techniques, policing, shaping and fair queueing (also termed fair scheduling) have proven useful. These techniques are discussed below in the context of regulating traffic formatted into cells as in ATM networks.

Traffic policing is one technique used to monitor and regulate accepted connections. If the arrival of a cell into a network causes a connection to violate its contract, a policer may either drop the cell or mark the cell so as to assign it a low priority. Cells marked with a low priority may later be dropped from the network if, for example, congestion is encountered at nodes along the path of the connection. Policing thus prevents "malicious" or heavily loaded connections from compromising the performance of other connections. Since policing ensures that all connections abide by their contracts, admission decisions are more accurate, and the network's ability to predict and guarantee a connection's quality-of-service is improved. Although policing can ensure contract compliance, policing typically is an over-conservative traffic regulation technique. More specifically, policing will drop or mark all cells that are even momentarily nonconforming (i.e., in violation of their contract) when the connection otherwise obeys its traffic contract over a larger time interval.

In the traffic shaping technique for regulating traffic, cells are delayed (e.g., the cells are stored in a buffer) until the cells conform to the connection's contract (i.e., to the traffic descriptors). Thus, shaping accommodates variation in traffic flow by smoothing a stream of incoming cells. Without such smoothing, the network must either reserve resources to accommodate bursts of cells, some of which may be nonconforming, or else suffer degraded performance. In addition, shaping can smooth traffic traveling between networks that operate with different nodes and possibly at different link bandwidths. Although shaping can reduce cell loss (since cells are buffered instead of dropped), the smoothing function introduces additional delay and implementation complexity since the shaper must buffer nonconforming cells and schedule them for transmission at a later time when the cells become conforming. A single network access point often services thousands of connections with different traffic descriptors, thus efficient and scaleable techniques for buffering and transmission scheduling of cells are required with traffic shaping techniques.

Shapers and policers (i.e., devices which employ shaping and policing techniques, respectively) often employ some type of a leaky bucket controller on an incoming stream of cells to enforce compliance with traffic descriptors. A leaky bucket controller generates token credits at a rate ρ which are deposited in a token bucket which token bucket holds at most σ tokens. When a cell in the incoming stream arrives at the leaky bucket controller, the cell must claim a token in the leaky bucket before being carried through the network. If no token is immediately available, the cell is discarded or marked with a low priority (if policing is used) or the cell is buffered (if shaping is used). If a token is immediately available, the cell is carried through the network. Given the status of the token bucket (i.e., the value of ρ, σ and the number of tokens in the bucket) for each connection, the shaper/policer can determine the conformance time of an arriving cell (i.e., the time at which the arriving cell first conforms to the VC traffic descriptors and at which time a token will be available in the buffer for the arriving cell). A connection is said to be (ρ,σ) compliant if all of its cells are conforming.

The leaky bucket notion can also be used to characterize the rate and burstiness of a connection either in isolation or as intermixed with other connections on a common link. Consider a connection α and some appropriate time frame. Let $\rho_{in}^\alpha$ denote the rate at which cells arrive to connection α over this time frame. Let denote the smallest token capacity such that connection α is ($\rho_{in}^\alpha$, $\sigma_{in}^\alpha$) compliant over the time frame. The parameter $\sigma_{out}^\alpha$ is a measure of the burstiness of connection cells departing from the leaky buck regulator. The parameter $\rho_{out}^\alpha$ denotes the rate at which cells in connection α depart the leaky bucket regulator. While $\sigma_{in}^\alpha$ need not bear any relation to σ,$\rho_{in}^\alpha$ should be less than or equal to ρ if no cells are to be dropped. If $\rho_{in}$<ρ for each connection, then $\rho_{out}=\rho_{in}$ for each connection on a common link.

Though appropriate leaky bucket-type controllers can ensure stable behavior over a long time scale, these controllers do not in themselves mitigate conflicts that may arise over short time intervals (e.g., on the order of the time needed to transmit 100 cells). Ideally, where shaping is used, a cell is transmitted as soon as it conforms to the connection contract. Conflicts occur when multiple cells, from different connections to the same node, become eligible for transmission at the same time. Such a condition is termed a "collision." The shaper must therefore arbitrate among competing conforming cells for transmission on an outgoing link. Depending on how the shaper arbitrates amongst competing cells, these collisions can cause a connection to violate its traffic contract and increase shaping delays (i.e., newly conforming cells will have to wait in the buffer for longer periods of time while other conforming cells are transmitted). These violations distort the traffic expectations of other nodes in the network thereby potentially causing increased cell loss rates and delay through the network.

Fair queueing schedulers (FQ) are a class of techniques for generating an output stream of traffic by arbitrating among collisions. In idealized fair queueing, each connection is guaranteed to receive its share of bandwidth in a link on a small time scale. It has been shown that if an idealized FQ scheme is used to arbitrate among traffic from a set of connections input to a node where the traffic from each connection is already leaky bucket compliant, the FQ scheme can closely preserve the ρ and σ parameters for the leaky bucket associated with each connection. A. K. Parekh and R. G. Gallager, "A generalized processor sharing approach to flow control in integrated services networks—the single node case," *Proc. IEEE INFOCOM,* pp. 915–924, 1992; A. K. Parekh and R. G. Gallager, "A generalized processor sharing approach to flow control in integrated services networks—the multiple node case," *Proc. IEEE INFOCOM,* pp. 521–530, 1993. Moreover, the parameters that characterize the stream of output traffic from the node will be a function of parameters characterizing each of the connections inputting traffic to the node.

However, if traffic in FQ schemes is noncompliant and nonconforming cells are buffered, FQ schemes break down, e.g., congestion in the network increases. Further, when such schemes break down, there is no guarantee that parameters that characterize the stream of output traffic from the node will be a function of the parameters characterizing each of the connections inputting traffic to the node, and thus the network's ability to guarantee quality-of-service requirements for admitted connections will be degraded. Moreover, FQ scheme typically do not scale well, i.e., the implementation complexity of such scheme becomes great when the number of connections in the set of connections served by the fair queueing scheme becomes large (as is typically the case with ATM networks).

Thus, there is need for improved traffic control techniques which overcome the shortcomings of policing, shaping and fair queueing traffic control techniques.

SUMMARY

In accordance with the present invention it is recognized that traffic in a network may advantageously be regulated by a technique which combines leaky bucket traffic shaping and fair queueing techniques in an integrated fashion. In particular, the inventive method operates on incoming traffic, both leaky bucket compliant and leaky bucket noncompliant, and shapes the outgoing traffic. Advantageously, the traffic is shaped so that the leaky bucket traffic contracts for each connection are preserved thereby enabling the stream of output traffic to be characterized as a function of the parameters characterizing each of the connections. Such a characterization typically improves that improved network performance by providing consistent service to each connection on a small time scale. Moreover, because the techniques are combined in an integrated fashion, they scale well.

The inventive fair leaky bucket server technique is advantageously implemented in a node in a network using a set of queues and a server. In the inventive method the node is a part of a path for a set of connections, and an incoming cell received from a connection in the set of connections has an asociated conformance time. An incoming cell received from a connection has an assigned queue, and each head-of-line cell in each queue in the set of queues has a virtual finishing time. The cell with the smallest virtual finishing time is selected from among all the head-of-line cells, and if the selected cell is conforming, the selected cell is transmitted from the node. If the selected cell is not conforming, then the selected cell is rescheduled for transmission.

DETAILED DESCRIPTION

Figure 1:
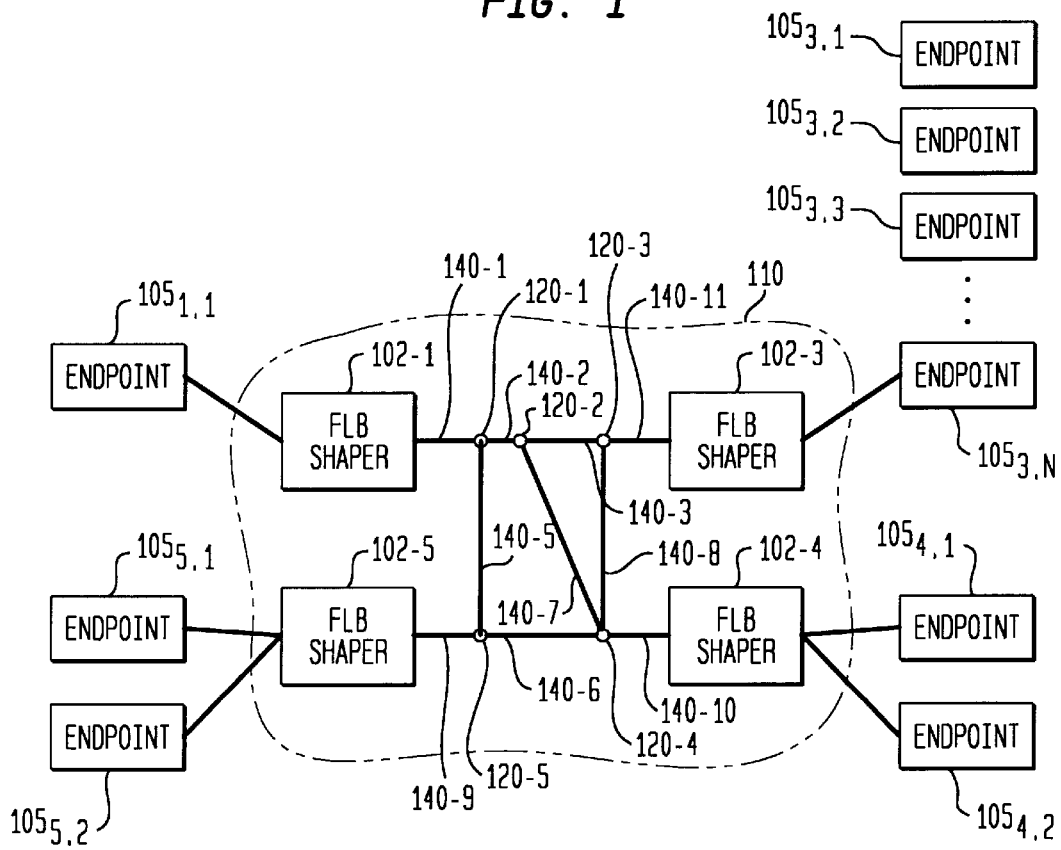
FIG. 1 illustrates a network in which the inventive method may be practiced.

The following detailed description is divided into three parts. In part I an overview of the inventive method and apparatus is presented. In part II aspects of fair queueing (FQ) are reviewed. In part III the inventive method and apparatus are discussed in detail.

I. Overview

The inventive fair leaky bucket (FLB) shaper method combines leaky bucket control with fair queueing to smooth the incoming traffic and limit distortion in resulting output streams. The combination therefore advantageously shapes nonconforming incoming traffic into a conforming output stream. The FLB shaper advantageously scales well (by reducing implementation complexity) by admitting all arriving cells, both conforming and nonconforming. Admitting nonconforming traffic to the FLB shaper avoids complex hardware mechanisms for detecting newly conforming cells among the buffered cells.

The FLB shaper, advantageously implemented in a node, comprises a set of queues and a queue server. An admitted or arriving cell is assigned to one of the queues. If a cell is the head-of-line cell of its queue (i.e., if it is the first cell in its queue), the FLB shaper assigns a virtual finishing time indicative of the priority assigned to the cell, even if this cell has not reached its conformance time. The server then selects for transmission on an outgoing link from a node, the head-of-line cell with the smallest virtual finishing time. If the selected head-of-line cell is nonconforming, it is rescheduled for transmission, i.e., the cell is again assigned a new virtual finishing time and is assigned to a one of the queues and awaits becoming the head-of-line cell for that queue. If the selected cell is conforming, it is transmitted on the outgoing link.

II. Fair Queueing Schemes

As noted previously, fair queueing (FQ) schemes are a class of techniques for arbitrating among collisions. Collisions between conforming cells arise because multiple connections compete for access to an outgoing link. A shaper could preserve leaky bucket parameters if each connection $\alpha$ had access to a private, dedicated link of rate at least $\rho^\alpha$, its average bandwidth requirement, instead of sharing the link with other traffic. While this is not practically feasible (since there are a relatively small number of discrete bandwidths characterizing physical links), it has provided the basis for other techniques for arbitrating among collisions. In so-called idealized or generalized processor sharing, the notion of a dedicated link is approximated by continuously dividing link bandwidth amongst backlogged connections (i.e., connections that currently have a cell queued) in proportion to assigned weights $r^\alpha$. If these weights are chosen as $r^\omega \propto \rho^\omega$, and $\Sigma_\omega \rho^\omega < 1$ (assuming the rates are normalized with respect to the link bandwidth), the link can continuously serve connection $\alpha$ at rate $\rho^\alpha$ or faster. This ensures that generalized processor sharing preserves the leaky bucket contract for each connection.

Although idealized fair queueing cannot be directly implemented since it requires preemption of link resources on an arbitrarily small time scale, versions of fair queueing that operate on a cell as a unit rather than on an arbitrarily small time scale have been proposed. In particular, these versions nearly retain the fairness properties of the idealized fair queueing (i.e., each link is guaranteed a portion of the link bandwidth). Two of these versions, weighted fair queueing (WFQ) and self-clocked fair queueing (SCFQ) are discussed in more detail herein.

Weighted fair queueing (WFQ) approximates idealized fair queueing by ranking cells by the time they would complete service under idealized fair queueing (i.e., by the time that the last portion of the cell would be transmitted on the outgoing link as measured in virtual time as described below). In effect, then, WFQ approximates idealized fair queueing by ordering the cells awaiting access to an outgoing link. In particular, WFQ operates by time stamping arriving cells using a virtual time scale, related to the idealized FQ scheme. WFQ then transmitting cells with the smallest time stamp.

To be more specific, WFQ approximates idealized fair queueing by maintaining a virtual time $R(t)$ such that $R(0)=0$ and, assuming $B(t)$ is the set of busy connections in the idealized fair queueing simulation at time t, $$\frac{dR(t)}{dt} = R'(t) = \left( \sum_{w \in B(t)} r^w \right)^{-1}$$

if $B(t)$ is not empty; if $B(t)$ is empty, any convention can be used provided $R'(t)$ is nonnegataive. The virtual time $R(t)$ represents the idealized fair queueing server's progress in servicing the backlogged connections, while $R'(t)$ is the normalized service rate.

Maintaining $R(t)$ allows the WFQ approximation to determine the virtual starting and finishing times for an incoming cell, independent of future arrivals to the system. If cell k of connection $\alpha$ enters the system at time t, it is input to a FIFO queue associated with the connection. The virtual starting and finishing times for the $k^{th}$ cell entering under the WFQ service are, respectively, $$S_k^\alpha = max\{F_{k-1}^\alpha, R(t)\}$$

$$F_k^\alpha = S_k^\alpha + 1/r_\alpha$$

assuming a common cell length, as in ATM. If cell k arrives to an empty connection queue (i.e., it is the head-of-line cell in its assigned queue), the WFQ service begins serving the cell as soon as it arrives (at virtual time $R(t)$); otherwise, the cell enters service when the fair queueing servicer finishes transmitting the cell that was previously the head-of-line cell in the queue (at virtual time $F_{k-1}^\alpha$). The term $1/r^\alpha$ represents the normalized work required to service the new cell. When weighted fair queueing must select a cell for transmission, the server picks the cell with the smallest virtual finishing time F among the cells already queued for service (breaking ties arbitrarily).

Computing $R(t)$ is complex. Self-clocked fair queueing (SCFQ) uses the virtual finishing time $F^{serv}$ of the cell currently in service as an estimate of current virtual time, thereby avoiding the burden of computing $R(t)$. SCFQ typically retains the throughput fairness properties of FQ and WFQ while simplifying the assignment of virtual finishing times. In addition, a SCFQ server can postpone assigning a value for the virtual finishing time of a cell until the cell reaches the head of its connection's queue. When a cell from connection $\alpha$ becomes the head-of-line cell of its connection queue, its virtual finishing time is $F^\alpha = F^{serv} + 1/r^\alpha$.

Although FQ schemes work well when traffic is leaky bucket compliant, as noted above FQ schemes break down when handling noncompliant traffic. Moreover, FQ scheme typically do not scale well. Hence, an improved method and apparatus for traffic regulation is needed.

III. Leaky Bucket Traffic Shaping Using Fair Queueing Collision Arbitration

FIG. 1 illustrates a network in which the inventive method of fair leaky bucket shaping may be practiced. Network 110 comprises nodes 120-j and links 140-n. Each link has associated with it a respective bandwidth, and each node has associated with it a respective buffer space. Traffic (e.g., signals representing information such as data, voice, text, and/or video) is input to network 110 from endpoints $105_{j,n}$. When information is to be exchanged between endpoints (i.e., when a call is made between an initiating endpoint and a destination endpoint), the initiating endpoint makes a request that a path carrying the call be established in the network between the two endpoints. For example, one possible path between endpoints $105_{1,1}$ and $105_{3,1}$ comprises nodes 120-1, 120-2 and 120-3 and links 140-1, 140-2 140-3 and 140-11. Selecting a particular path to carry a call through the network requires that the nodes and links in the particular path have sufficient available resources to accommodate the information exchange. The network typically will estimate the amount of resources needed by the information exchange and admit the call based on some criterion that typically will limit the amount of congestion in the network while ensuring any quality-of-service commitments to users are met. Network 110 advantageously comprises fair leaky bucket shaper 102-j located between each endpoint $105_{j,n}$ and node 120-j. Fair leaky bucket shaper 102-j advantageously regulates the admission of information from endpoint $105_{j,n}$ into network 110.

Figure 2:
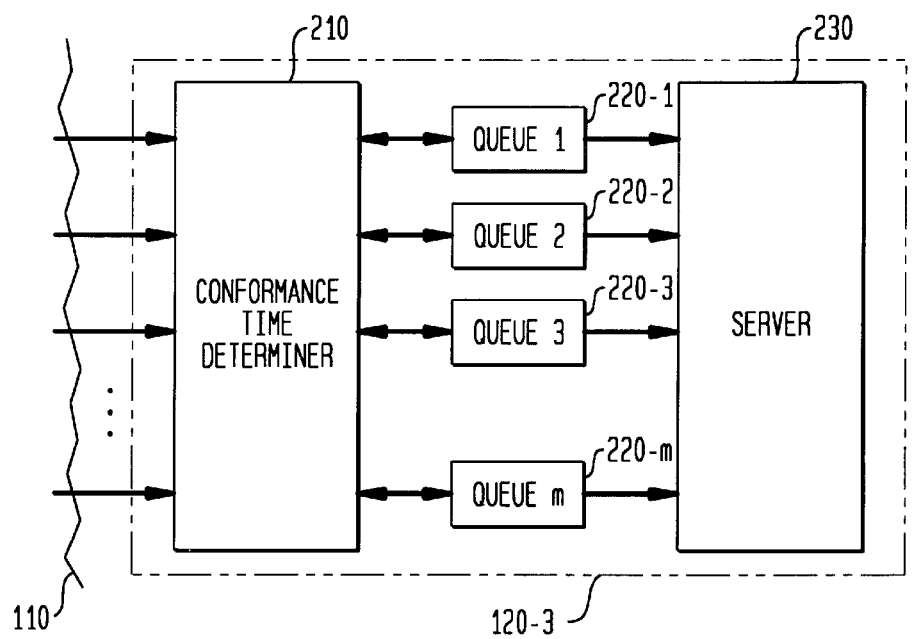
FIG. 2 is a block diagram of a fair leaky bucket shaper for implementing the inventive method.

FIG. 2 is a block diagram of an implementation of the inventive fair leaky bucket shaper. In particular, FIG. 2 illustrates an implementation of FLB shaper 102-3 of FIG. 1 in which traffic from N endpoints, $105_{3,n}$, n=1,2, ... N, is input to network 110 at node 120-3. FLB shaper 102-3 comprises conformance time determiner 210, queues 220-m and server 230. In one embodiment of the inventive method, queue 220-m advantageously is a FIFO queue which is associated with connection k input to node 120-j. In other embodiments of the inventive method, discussed below, implementation complexity may be lowered by reducing the number of queues.

Figure 3:
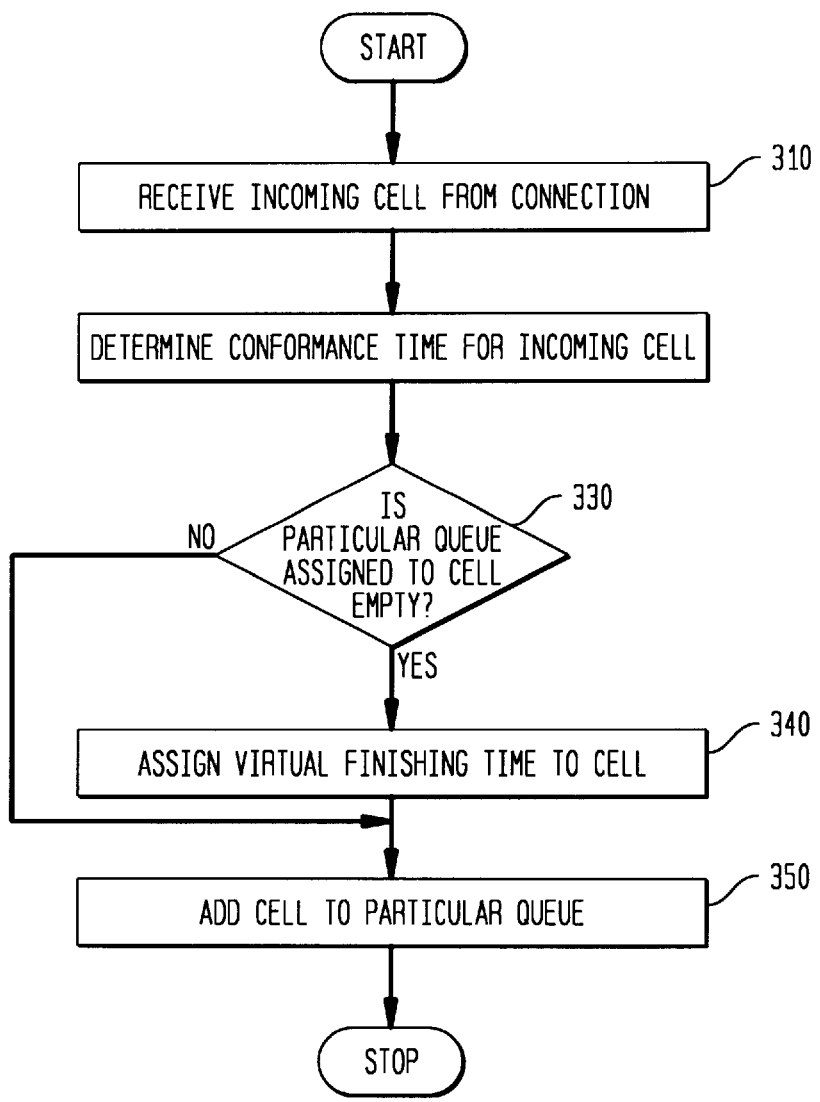
FIG. 3 is a flowchart of steps in the inventive for determining conformance times and for assigning cells to a proper queue.

FIG. 3 illustrates steps useful in the inventive method in which the FLB shaper handles cell arrivals and cell selection by the server. In step 310, the FLB shaper receives an incoming cell from a connection. Let the incoming cell and the connection be denoted k and α, respectively. In step 320 the FLB shaper determines the incoming cell's conformance time $t_c^{\alpha,k}$. In step 330, the FLB shaper determines if a particular queue in the set of queues (to which the cell is to be added) is empty. If the particular queue is empty, the FLB shaper assigns a virtual finishing time to the incoming cell $F^\alpha$ (step 340) and adds the incoming cell to the particular queue (step 350). The determination of the virtual finishing time is discussed in greater detail below. If the queue is not empty, the FLB shaper simply adds the incoming cell to the particular queue (step 350).

Figure 4:
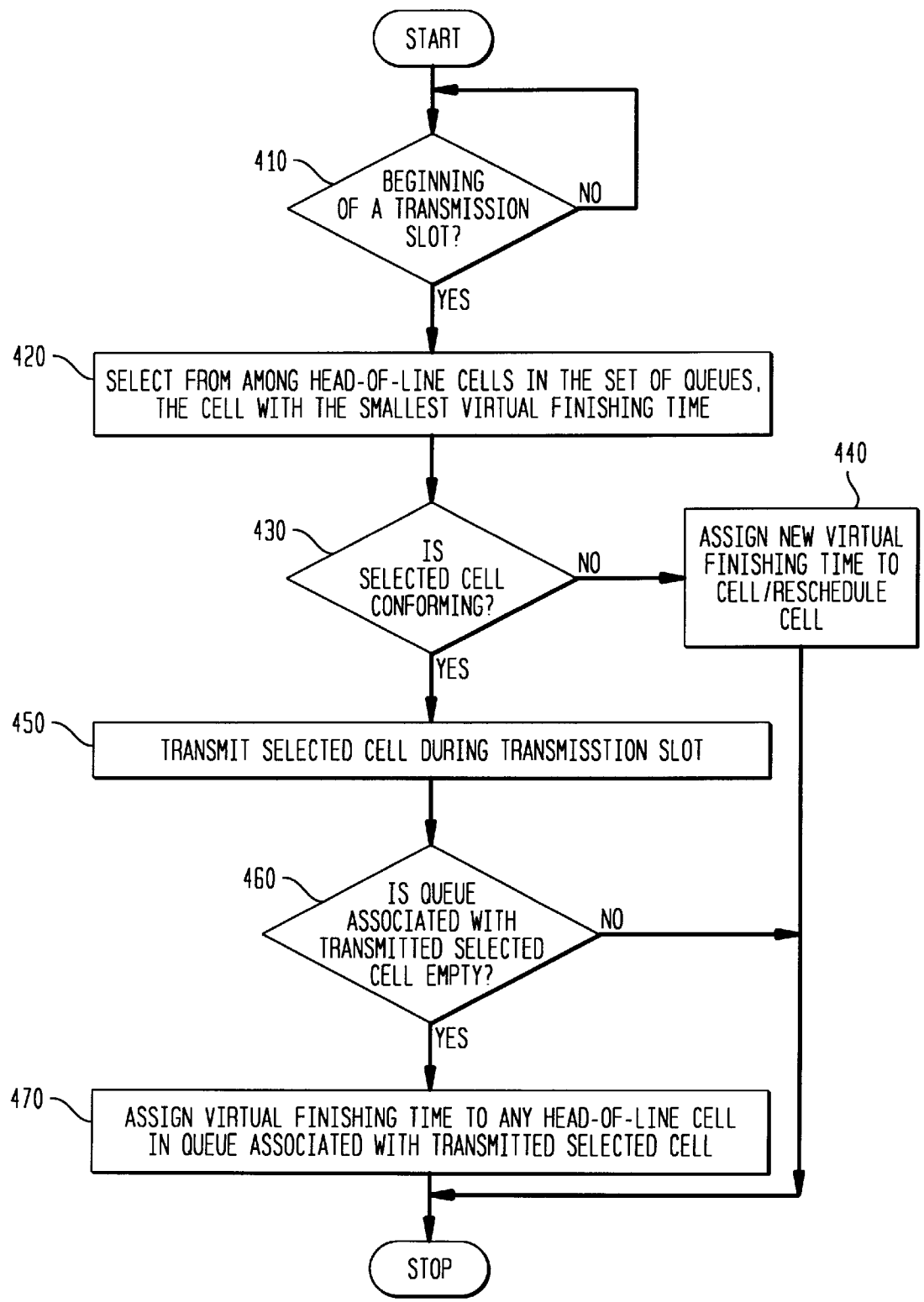
FIG. 4 is a flowchart of steps in the inventive method for determining whether to transmit a cell during a transmission slot.

FIG. 4 is a flowchart of further steps in the inventive method. When the start of a transmission slot occurs (step 410), the server (e.g., server 230 of FIG. 2) in step 420 selects a cell with the smallest virtual finishing time from among all the head-of-line cells in the set of queues. In step 430 the FLB shaper determines if the selected cell is conforming. If the selected cell is conforming, the selected cell is transmitted during the transmission slot (step 450). Once the selected cell is transmitted, the FLB shaper determines if the queue associated with transmitted selected cell is empty (step 460). If the queue is not empty, in step 470 the FLB shaper assigns a virtual finishing time to any new head-of-line cell in the queue associated with the transmitted selected cell. If the queue is empty, the queue must wait for an incoming cell to be added to the queue (as the head-of-line cell) before a virtual finishing time is determined.

While the link can readily transmit a conforming cell, transmitting a nonconforming cell would violate the connection's leaky bucket parameters. Thus, if the selected cell is nonconforming, the FLB shaper treats this nonconforming cell as a new arrival to the head of its queue by assigning it a new virtual finishing time in step 440 which new virtual finishing time advantageously accounts for the link bandwidth the cell would otherwise have consumed.

The inventive FLB shaper thus ensures that rescheduling a nonconforming cell does not penalize the traffic in other connections and guarantees that each connection receives sufficient link bandwidth, independent of other traffic. Although rescheduling the cell consumes a transmission slot (even if other connections await service) a rescheduling can only occur when a connection has no leaky bucket tokens and no conforming cells awaiting service. Hence, because this nonconforming cell has not become conforming since the transmission of the connection's previous cell, the affected connection has been receiving all the bandwidth to which it is entitled based on its contract.

Rescheduling nonconforming cells simplifies the FLB shaper implementation without significantly distorting the leaky-bucket parameters of the resulting output stream. When a new cell arrives, the shaper identifies the appropriate queue and computes the cell's conformance time; later, when the server selects the cell, this conformance time stamp determines whether the FLB shaper transmits the cell or reschedules it for later service. As a result, the FLB shaper ranks cells by their virtual finishing times, instead of sorting cells by conformance times as in the straightforward implementation of a shaper which, unfortunately, can greatly increase the burstiness of outgoing traffic streams.

Although the inventive method will reschedule nonconforming cells, the inventive method will preserve leaky bucket connection contract. Recall that for incoming traffic from connection α that is $(\sigma^\alpha, \rho^\alpha)$ compliant, the idealized fair queueing scheme would ensure that the output stream is also $(\sigma^\alpha, \rho^\alpha)$ compliant. In the inventive method and apparatus, that same incoming traffic (assuming that $\Sigma_\alpha \rho^\alpha < 1$, i.e., that the load on the link is less than its capacity) is advantageously $(\sigma^\alpha+1, \rho^\alpha)$ compliant if the server uses WFQ to compute virtual finishing times and $(\sigma^\alpha+x, \rho^\alpha)$, where x is small, if SCFQ is used to compute the virtual finishing times.

Traffic shapers in high-speed networks require efficient hardware mechanisms for arbitrating amongst competing cells. A shaper can reduce sorting complexity by considering only the head-of-line cell from each active connection, while holding the remaining cells in per-connection queues. These queues can consist of logical FIFOs in a common shared memory with an idle-address pool maintaining a list of available buffer slots. When the shaper ranks cells by conformance times, per-connection queueing reduces the number of cells and the range of conformance times that the sorting mechanism must handle. Similarly, per connection FIFOs can reduce sorting complexity in the FLB shaper by limiting the range of virtual finishing times.

Under self-clocked fair queueing, if connection α is backlogged at time t, its head-of-line cell satisfies $S^\alpha \leq F^{serv} \leq F^\alpha$, since the cell has reached the head of its queue but has not completed service. Since $S^\alpha = F^\alpha - 1/r^\alpha$, and letting B(t) denote the set of active connections, $$F^{serv} \leq F^\alpha \leq F^{serv} + 1/r^\alpha \, \forall \alpha \in B(t)$$

Hence, at time t all virtual finishing times fall in the range $[F^{serv}, F^{serv}+1/r^{min}]$, where $r^{min}=\min_w \{r^w\}$ and $F^{serv}$ is the virtual finishing time of the cell currently in service. This range of virtual finishing times becomes a finite set under some practical restrictions on connection weights as discussed below. If a SCFQ server has integer $1/r^\alpha$ values for all connections $\alpha$, the F values are also integers; this property does not hold for WFQ severs since R(t) is a continuous function under WFQ. With integer finishing times, a SCFQ server handles head-of-line cells with at most $1+1/r^{min}$ different F values, independent of the number of connections.

Under this finite set of virtual finishing times, the inventive FLB server, using SCFQ to determine virtual finishing times, can be implemented with a small collection of FIFOs, with one queue for each F value. The server arbitrates fairly amongst competing connections by sequencing through these FIFOs, draining one queue completely before proceeding to the next non-empty queue. The queue in service represents the current value of $F^{serv}$. When connection $\alpha$ has a new head-of-line cell, the server implicitly assigns a virtual finishing time by placing the cell (or a pointer to the cell) in the queue $1/r^\alpha$ away from the FIFO currently in service. This ensures that connection receive service in proportion to their bandwidth requirements $r^\alpha \propto \rho^\alpha$.

In effect the SCFQ implementation dynamically creates a fair schedule for the active connections, with each new head-of-line cell joining a FIFO based on its connection's weight. For example, if all connections have equal weights, $r^\alpha=1$, then each head-of-line cell has a virtual finishing time of either $F^{serv}$ or $F^{serv}+1$. Thus, the SCFQ server can simply toggle between two FIFO queues, with the link serving one FIFO while new head-of-line cells join the other. Actually, a single FIFO queue suffices since all new head-of-line cells have virtual finishing time $F^{serv}+1$ and can be served after any traffic already in the FIFO. By ranking cells according to virtual finishing times, the FLB shaper avoids sorting across a wide range of cell conformance times; even with per-connection queueing, head-of-line cells can have arbitrary conformance times up to $1/\rho^{min}$ into the future, requiring a large number of sorting FIFOs to distinguish between competing cells.

Since fair queueing defines connection bandwidths as ratios of weights, limiting these weights to the inverse of integers does not impose a significant restriction. The required number of FIFOs increase as the SCFQ server incorporates a wider range and granularity of connection weights. Suppose the server imposes $r^{max}/r^{min}=n$, with a granularity of m connection weights between $r^{min}$ and $r^{max}$, by using weights $\{1/(m), 1/(2m), \ldots 1/(nm)\}$; for example, in n=2 and m=3, the server could allow weights $\{\frac{1}{2}, \frac{1}{3}, \frac{1}{4}\}$. As a result, the SCFQ implementation requires at most nm+1 FIFOs to sort fairly amongst the competing connections. This significantly reduces the implementation complexity of SCFQ and FLB shaping, particularly for a small range of connection bandwidth requirements.

The FLB shaper can efficiently support a finer grain of connection rates through an approximate implementation of self-clocked fair queueing. In this approach, the shaper permits arbitrary connection weights $r^\alpha$ and associates each FIFO queue with a range of virtual finishing times; the server implicitly rounds each cell's F value to select the appropriate FIFO in the calendar queue. Each connection $\alpha$ can maintain its full, non-integer virtual finishing time to correctly assign the $F^\alpha$ value for the next head-of-line cell.

This disclosure describes a technique for regulating traffic in a network. The method may be implemented in such a fashion as to be scalable and thus to be useful in regulating traffic from many connections at a node. While the above teaching of the present invention has been in terms of ATM networks, those skilled in the art will recognize the applicability of this teaching to other types of data and communication networks.

The method disclosed herein has been described without reference to specific hardware or software. Instead the method has been described in such a manner that those skilled in the art can readily adapt such hardware and software as may be available or preferable.

We claim:

1. A method of regulating traffic in a network, wherein the network comprises a node, wherein the node is a part of a path for a set of connections, wherein an incoming cell received from a connection in the set of connections has an associated conformance time, wherein an incoming cell received from a connection is assigned to a queue in a set of queues, and wherein each head-of-line cell in each queue in the set of queues has a virtual finishing time, the method comprising the steps of:

selecting the cell having the smallest assigned virtual finishing time from among all the head-of-line cells in the set of queues, transmitting the selected cell from the node if the selected cell is conforming based on its associated conformance time, and otherwise, rescheduling the selected cell for transmission, wherein the step of transmitting the selected cell further comprises the step of:

assigning a virtual finishing time to the new head-of-line cell in the queue assigned to the transmitted selected cell if the queue assigned to the transmitted selected cell is not empty.

2. A method of regulating traffic in a network, wherein the network comprises a node, wherein the node is a part of a path for a set of connections, wherein an incoming cell received from a connection in the set of connections has an associated conformance time, wherein an incoming cell received from a connection is assigned to a queue in a set of queues, and wherein each head-of-line cell in each queue in the set of queues has a virtual finishing time, the method comprising the steps of:

selecting the cell having the smallest assigned virtual finishing time from among all the head-of-line cells in the set of queues, transmitting the selected cell from the node if the selected cell is conforming based on its associated conformance time, and otherwise, rescheduling the selected cell for transmission, wherein the step of rescheduling comprises the step of:

assigning a new virtual finishing time to the selected cell.

3. The method of claim 1 wherein the number of queues in the set of queues is equal to the number of connections in the set of connections.

4. A method of regulating traffic in a network, wherein the network comprises a node, wherein the node is a part of a path for a set of connections, wherein an incoming cell received from a connection in the set of connections has an associated conformance time, wherein an incoming cell received from a connection is assigned to a queue in a set of queues, and wherein each head-of-line cell in each queue in the set of queues has a virtual finishing time, the method comprising the steps of:

selecting the cell having the smallest assigned virtual finishing time from among all the head-of-line cells in the set of queues, transmitting the selected cell from the node if the selected cell is conforming based on its associated conformance time, and otherwise, rescheduling the selected cell for transmission, wherein the virtual finishing time assigned to each head-of-line cell in each queue is determined based on weighted fair queuing.

5. The method of claim 1 wherein the virtual finishing time assigned to each head-of-line cell in each queue is determined based on self-clocked fair queuing.

6. A method of regulating traffic in a network having at least one node which node is a part of a path for a set of connections, the method comprising the steps of:

receiving an incoming cell from a connection in the set of connections, determining a conformance time for the incoming cell, determining if a particular queue in the set of queues is empty, and if so, assigning a virtual finishing time to the incoming cell, adding the incoming cell to the particular queue, selecting the cell having the smallest virtual finishing time from among all the head-of-line cells in the set of queues, transmitting the selected cell from the node if the selected cell is conforming, and otherwise, rescheduling the selected cell for transmission if the selected cell is not conforming, wherein the step of transmitting the selected cell further comprises the step of:

assigning a virtual finishing time to the new head-of-line cell in the particular queue if the particular queue is not empty.

7. A method of regulating traffic in a network having at least one node which node is a part of a path for a set of connections, the method comprising the steps of:

receiving an incoming cell from a connection in the set of connections, determining a conformance time for the incoming cell, determining if a particular queue in the set of queues is empty, and if so, assigning a virtual finishing time to the incoming cell, adding the incoming cell to the particular queue, selecting the cell having the smallest virtual finishing time from among all the head-of-line cells in the set of queues, transmitting the selected cell from the node if the selected cell is conforming, and otherwise, rescheduling the selected cell for transmission if the selected cell is not conforming, wherein the step of rescheduling comprises the step of:

assigning a new virtual finishing time to the selected cell.

8. The method of claim 6 wherein the number of queues in the set of queues is equal to the number of connections in the set of connections.

9. The method of claim 6 wherein the virtual finishing time assigned to the incoming cell is determined based on weighted fair queuing.

10. The method of claim 6 wherein the virtual finishing time assigned to the incoming cell is determined based on self-clocked fair queuing.

11. A method of regulating traffic in a network, wherein the network comprises a node, wherein the node is a part of a path for a set of connections, each connection in the set of connections having an associated queue, the method comprising the steps of:

receiving an incoming cell from a particular connection in the set of connections, determining a conformance time for the incoming cell, determining if the queue associated with the particular connection is empty, and if the queue is empty, assigning a virtual finishing time to the incoming cell, adding the incoming cell to the queue associated with the particular connection, selecting the cell having the smallest virtual finishing time from among all the head-of-line cells in the set of queues, transmitting the selected cell form the node if selected cell is conforming, and otherwise, rescheduling the selected cell for transmission if the selected cell is not conforming, wherein the step of transmitting the selected cell further comprises the step of:

assigning a virtual finishing time to a new head of line cell in the queue associated with the transmitted selected cell if the queue is not empty.

12. A method of regulating traffic in a network, wherein the network comprises a node, wherein the node is a part of a path for a set of connections, each connection in the set of connections having an associated queue, the method comprising the steps of:

receiving an incoming cell from a particular connection in the set of connections, determining a conformance time for the incoming cell, determining if the queue associated with the particular connection is empty, and if the queue is empty, assigning a virtual finishing time to the incoming cell, adding the incoming cell to the queue associated with the particular connection, selecting the cell having the smallest virtual finishing time from among all the head-of-line cells in the set of queues, transmitting the selected cell form the node if selected cell is conforming, and otherwise, rescheduling the selected cell for transmission if the selected cell is not conforming, wherein the step of rescheduling further comprises the step of:

assigning a new virtual finishing time to the selected cell.

13. The method of claim 2 wherein the number of queues in the set of queues is equal to the number of connections in the set of connections.

14. The method of claim 2 wherein the virtual finishing time assigned to each head-of-line cell in each queue is determined based on self-clocked fair queuing.

15. The method of claim 4 wherein the number of queues in the set of queues is equal to the number of connections in the set of connections.

16. The method of claim 4 wherein the virtual finishing time assigned to each head-of-line cell in each queue is determined based on self-clocked fair queuing.

17. The method of claim 7 wherein the number of queues in the set of queues is equal to the number of connections in the set of connections.

18. The method of claim 7 wherein the virtual finishing time assigned to the incoming cell is determined based on weighted fair queuing.

19. The method of claim 7 wherein the virtual finishing time assigned to the incoming cell is determined based on self-clocked fair queuing.

* * * * *